No. 785,159.

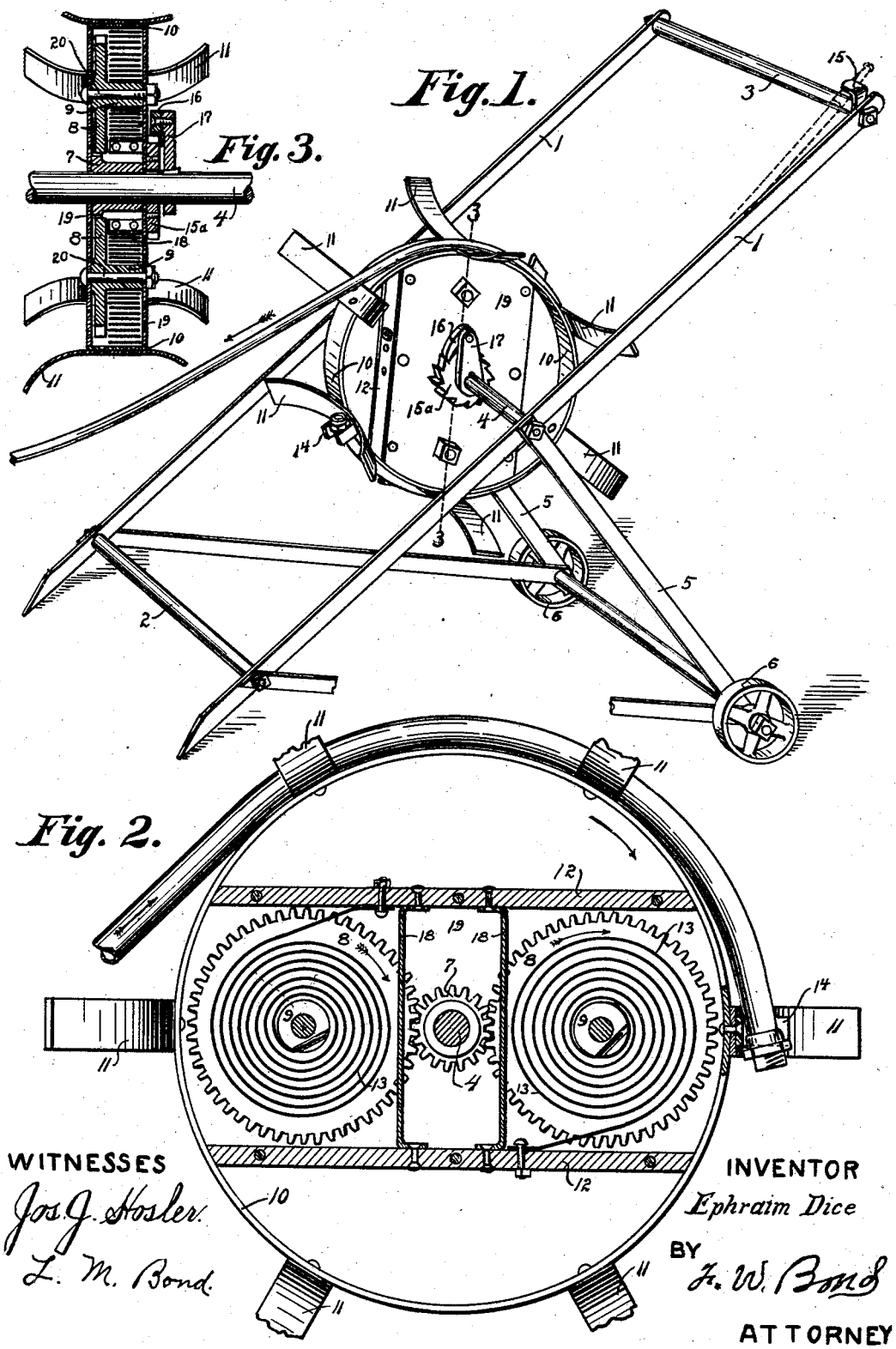

Patented March 21, 1905.

UNITED STATES PATENT OFFICE.

EPHRAIM DICE, OF CANTON, OHIO.

HOSE-REEL.

SPECIFICATION forming part of Letters Patent No. 785,159, dated March 21, 1905.

Application filed January 7, 1905. Serial No. 240,023.

*To all whom it may concern:*

Be it known that I, EPHRAIM DICE, a citizen of the United States, residing at Canton, in the county of Stark and State of Ohio, have invented certain new and useful Improvements in Hose-Reels; and I do hereby declare that the following is a full, clear, and exact description of the same, reference being had to the annexed drawings, making a part of this specification, and to the numerals of reference marked thereon, in which—

Figure 1 is a perspective view showing the different parts properly arranged. Fig. 2 is side view of the reel, showing the side plates removed and illustrating the spring winding mechanism in proper relative position. Fig. 3 is a transverse section on line 3 3, Fig. 1, except that the shaft is shown full.

Similar numerals of reference indicate corresponding parts in all the figures of the drawings.

In the accompanying drawings, 1 represents the side bars of the frame, which are held in proper relative position by means of the end bars 2 and 3 and the fixed center bar 4. The bars 1, together with the different parts carried thereby, are held in proper elevation by means of the truck-frame 5, which truck-frame is provided with the wheels 6. Upon the fixed center bar 4 is securely attached the pinion 7, which pinion meshes with the planetary wheels 8, which wheels are mounted upon or formed integral with the hubs 9. The band 10 is formed of a diameter of sufficient size to constitute the hose-reel proper, and upon the outer periphery of which band the hose is wound. For the purpose of holding the desired number of convolutions of hose the band 10 is provided with any desired number of hose-holding plates 11, which plates are curved substantially as illustrated in the drawings and are so curved for the purpose of receiving and holding the various convolutions of the hose. To the band 10 are attached the bars 12, which bars constitute the spokes of the reel-band 10.

To the hubs 9 are attached the inner ends of the springs 13 and the outer ends of said springs are attached to the bars 12 or their equivalents. The reel-band 10 is provided with the hose-connecting clip 14, and after the hose has been properly connected to the clip said hose will be wound upon the reel as the reel is rotated. When it is desired to remove the hose from the reel, the nozzle end of the hose is detached from the clip 15 and the hose unwound from the reel, and as the hose is unwound from the reel the rotation of the reel will impart rotation to the gear-wheels 8 as they revolve around the pinion 7, thereby storing power to the springs 13, and for the purpose of holding the springs when wound and preventing any backward rotation of the reel proper the ratchet-wheel 15ª is provided, which ratchet-wheel is held by means of the detent 16, which detent is pivotally attached to the arm 17, which arm is fixed to the rod 4.

When it is desired to place the hose upon the reel, it is connected to the clip 14 and the detent 16 released from the ratchet-wheel 15ª, at which time the springs 13 will cause the reel to rotate and wind the hose by its rotation, and when the hose is again removed for use the springs will again be wound by reason of the rotation of the reel during the time the hose is being unwound, which brings the springs into condition to exert their force in winding the hose upon the reel.

For the purpose of preventing the truck proper from moving upon the ground during the time the reel is unwound the lower ends of the bars 1 should be pointed, so that they will engage the surface of the ground and prevent the truck, together with the reel carried thereby, from traveling.

It will be understood that when the hose is properly wound upon the reel the bar 3 and the rear ends of the side bars 1 can be lowered, which in turn elevates the pointed ends of the bars 1, after which the reel proper can be moved to any desired point, the same traveling upon the wheels 6.

For the purpose of preventing the springs 13 from coming in contact with the pinion 7 when they are unwound or expanded the bars 18 are provided, which bars are located upon opposite sides of the pinion 7, substantially as illustrated in Fig. 2.

For the purpose of inclosing the springs, together with the different gear-wheels, the side plates 19 are provided, which side plates are connected in any convenient and well-known manner to the spoke-bars 12. The side plates 19 also provide a means for holding in proper position the gear-wheels 8 and their hubs 9, said hubs being mounted upon the cross-bolts 20, which cross-bolts are connected to the side plates 19.

Having fully described my invention, what I claim as new, and desire to secure by Letters Patent, is—

1. The combination of a truck-frame consisting of side bars and truck, a fixed rod having mounted thereon a pinion, a reel-band carrying planetary gear-wheels meshing with the pinion upon the fixed rod, springs operatively attached to the planetary gear-wheels, a ratchet-wheel fixed to the reel-rod, and a detent adapted to engage the ratchet-wheel, and the reel-band provided with hose-holding plates and a hose-holding clip, substantially as and for the purpose specified.

2. The combination of a frame consisting of side bars and a truck, a fixed bar provided with a pinion carried by the side bars of the frame, a reel-band provided with planetary gear-wheels meshing with the fixed pinion, springs operatively connected to the planetary gear-wheels, a ratchet-wheel secured to the reel-bar, and a detent to engage the ratchet-wheel, and the side bars of the reel-frame provided with pointed lower ends, substantially as and for the purpose specified.

In testimony that I claim the above I have hereunto subscribed my name in the presence of two witnesses.

EPHRAIM DICE.

Witnesses:
F. W. BOND,
L. M. BOND.